United States Patent [19]

Borugian et al.

[11] 4,200,174
[45] Apr. 29, 1980

[54] CAM AND ANCHOR PIN SPACER ARRANGEMENT FOR A BRAKE ASSEMBLY

[75] Inventors: Dennis A. Borugian, Farmington Hills; Gunnar Baltare, Livonia, both of Mich.

[73] Assignee: Eaton Corporation, Cleveland, Ohio

[21] Appl. No.: 912,271

[22] Filed: Jun. 5, 1978

[51] Int. Cl.² ............................................. F16D 51/22
[52] U.S. Cl. ................................ 188/329; 188/250 C; 188/341
[58] Field of Search ................... 188/1 A, 78, 250 A, 188/250 C, 250 F, 325, 326, 327, 328, 329, 330, 341

[56] References Cited

U.S. PATENT DOCUMENTS

| | | | |
|---|---|---|---|
| 1,771,011 | 7/1930 | Sauzedde | 188/330 |
| 1,967,413 | 7/1934 | La Brie | 188/250 C |
| 2,059,270 | 11/1936 | Parker | 188/329 |
| 2,381,737 | 8/1945 | Goepfrich et al. | 188/326 |
| 2,753,956 | 7/1956 | Chouings | 188/78 |
| 2,906,517 | 9/1959 | Goepfrich | 188/78 |
| 3,095,950 | 7/1963 | Scheel | 188/78 |
| 3,398,814 | 8/1968 | Deibel | 188/78 |
| 3,497,037 | 2/1970 | Deibel | 188/329 |
| 3,572,478 | 3/1971 | Nagel et al. | 188/330 |
| 3,837,446 | 9/1974 | Nilsson | 188/329 |

FOREIGN PATENT DOCUMENTS

| | | | |
|---|---|---|---|
| 686166 | 7/1930 | France | 188/329 |
| 1049241 | 12/1953 | France | 188/327 |

OTHER PUBLICATIONS

"Eaton Single Anchor Pin 'S' Cam Brakes", Eaton Catalog No. EB6-173, Rev. 574.

Primary Examiner—Edward R. Kazenske
Attorney, Agent, or Firm—R. J. McCloskey; H. D. Gordon

[57] ABSTRACT

A brake assembly for a vehicle includes a stamped spider member, an air chamber mounting bracket attached to one end of the stamped spider member, a cam shaft supported in the air chamber mounting bracket having an S-cam member affixed to one end thereof, cam spacer selectively locatable on the cam shaft for adjusting the relative position of the S-cam and the spider member, and an anchor pin supported on the spider member opposite from the air chamber mounting bracket with the anchor pin being supported in a cantilevered fashion at one end thereof by the spider member. A pair of brake shoes are provided having an anchor pin end engaging the anchor pin and an S-cam end engaging the S-cam member. Rotation of the S-cam effects pivotal movement of the braking shoes about the anchor pin to brake a vehicle associated therewith. An anchor pin spacer is selectively locatable on the anchor pin to selectively adjust the relative position of the brake shoes and the spider member. A return spring interconnect the S-cam ends of the brake shoes. A shoe retaining spring is connected to the web of each of the brake shoes adjacent to the anchor pin end thereof and extends around the anchor pin for biasing the anchor pin end of each of the brake shoes toward the other through the anchor pin. The shoe retaining spring is spaced inwardly in a radial direction from the shoetable of the brake shoes to shield the shoe retaining spring from the heat generated when the vehicle is braked.

9 Claims, 3 Drawing Figures

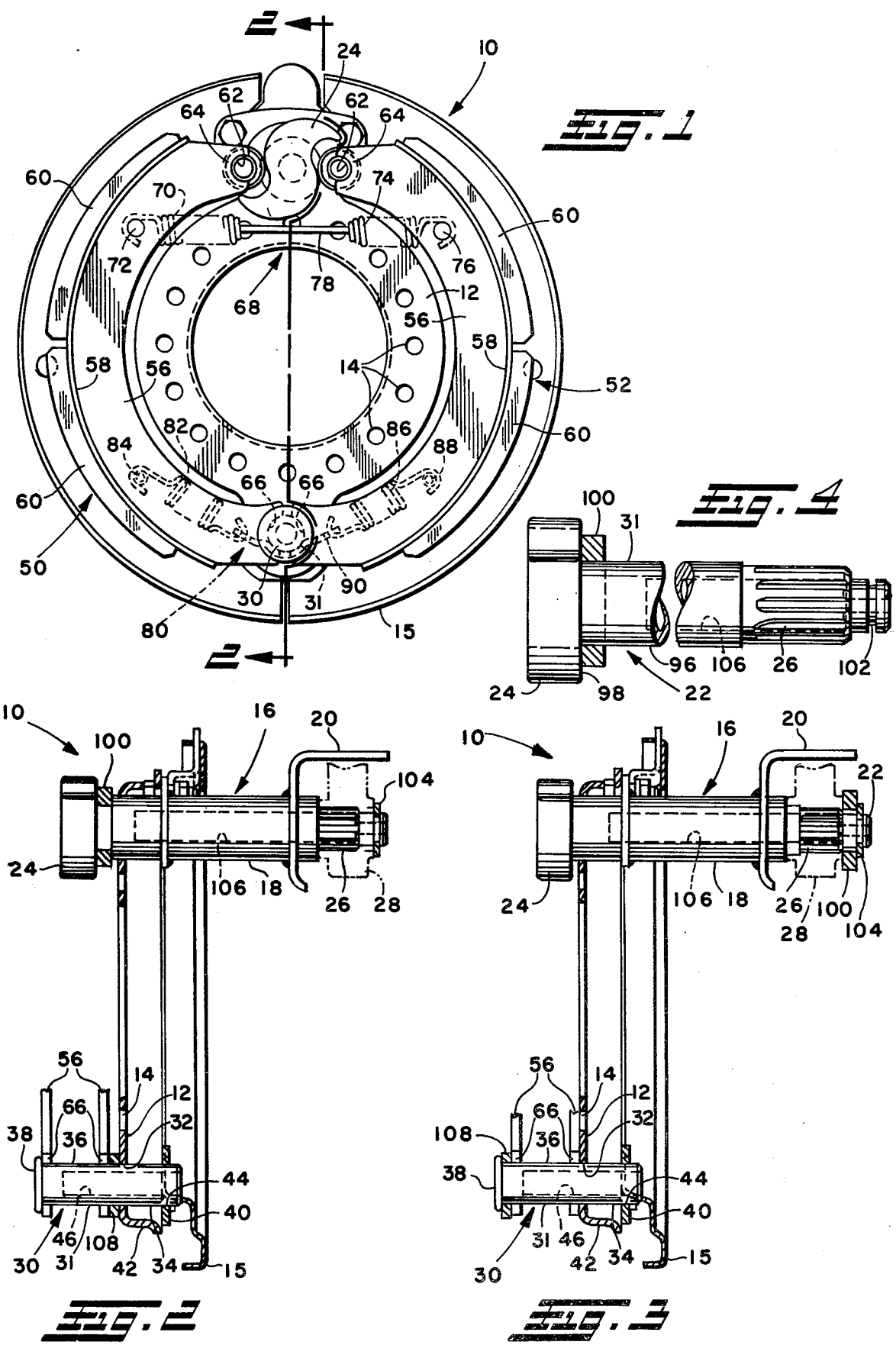

CAM AND ANCHOR PIN SPACER ARRANGEMENT FOR A BRAKE ASSEMBLY

BACKGROUND OF THE INVENTION

1. Field of the Invention

The present invention relates to an S-cam brake assembly and more specifically to an S-cam brake assembly wherein spacer means are provided to adjust the relative position of the S-cam and the spider member and the relative position of the brake shoes and the spider member to allow the brake assembly to vary the distance from the axle mounting face to the brake centerline. The retaining spring means is connected to the web of each of the brake shoes and extends around the anchor pin for biasing the brake shoes toward each other through the anchor pin. The shoe retaining spring means is also spaced inwardly in a radial direction from the shoetable of the brake shoes to thereby shield the shoe retaining spring means from the heat generated when the vehicle is braked.

2. Background of the Invention

S-cam brakes are known in the art. In most of the known S-cam brakes the offset, i.e., the distance measured from the axle mounting face to the brake centerline, is fixed. This requires a unique casting and machining combination for each individual offset which is desired. This results in higher manufacturing and warehousing costs than if a simple S-cam brake were provided which would have variable offsets.

The brake shoe retaining springs utilized in the prior art do not simultaneously provide for easy removal of brake shoes from the brake and for mounting of the springs away from the heat generated by the brake shoes and brake drum. The heat generated between the friction surfaces and the brake drum has an adverse affect on spring life. The known shoe retaining springs which are mounted away from the heat generating friction surface and brake drum do not extend around the anchor pin. Hence, the known retaining springs bias one end of each of the brake shoes against the anchor pin through a moment arm which is determined to be the distance between the point of attachment of the retaining springs and the point of engagement of the brake shoes with the anchor pin assembly. Such a known construction makes shoe removal from the brake mechanism difficult due to the forces exerted on the brake shoes by the springs through the moment arm against the anchor pin.

SUMMARY OF THE INVENTION

The present invention provides a new and improved brake assembly for a vehicle including a stamped spider member, an air chamber mounting bracket fixed to the stamped spider member, a cam shaft supported in the air chamber mounting bracket and having an S-cam member affixed to one end thereof, cam spacer means selectively locatable on the cam shaft for adjusting the relative position of the S-cam and the spider member, an anchor pin supported on the spider member in a cantilevered fashion at one end thereof, a pair of brake shoes each of which has one end engaging and pivotable about the anchor pin and an opposite end engaging the S-cam member, anchor pin spacer means selectively locatable on the anchor pin and engaging with the one end of the brake shoes to selectively adjust the relative position of the brake shoes and the spider member, return spring means interconnecting the opposite ends of the brake shoes and shoe retaining spring means interconnecting the one ends of the brake shoes for biasing the one ends of the brake shoes against the anchor pin.

The present invention further provides a new and improved brake assembly as set forth in the next preceding paragraph wherein each of the brake shoes includes a web, a shoetable and friction pad means supported on the shoetable, the shoe retaining spring means being connected to the web of each of the brake shoes adjacent the one end thereof and extending around the anchor pin for biasing the one end of each of the brake shoes toward each other through the anchor pin, the shoe retaining spring means being spaced inwardly in a radial direction from the shoetable of the brake shoes to thereby shield the shoe retaining spring means from the heat generated by the friction pad means when the vehicle is braked.

The present invention additionally provides a new and improved brake assembly for a vehicle including a spider member, an air chamber mounting bracket, a cam shaft supported in the air chamber mounting bracket having an S-cam member affixed to one end thereof, an anchor pin supported on the spider member, a pair of brake shoes each of which has one end engaging and pivotable about the anchor pin and an opposite end engaging the S-cam member, each of the brake shoes including a web, a shoetable and friction pad means, return spring means interconnecting the opposite ends of the brake shoes and shoe retaining spring means connected to the web of each of the brake shoes adjacent the one end thereof and extending around the anchor pin for biasing the one end of each of the brake shoes toward each other through the anchor pin, the shoe retaining spring means being spaced inwardly in a radial direction from the shoetable of the brake shoes to thereby shield the shoe retaining spring means from the heat generated by the friction pad means when the vehicle is braked.

Still another provision of the present invention is to provide a new and improved brake assembly as set forth in the next preceding paragraph wherein the shoe retaining spring means includes first spring means having one end connected to the web of one of the brake shoes and an opposite end, second spring means having one end connected to the web of the other of the brake shoes and opposite end, and an interconnecting link extending around the anchor pin and interconnecting the opposite ends of the first and second spring means.

DESCRIPTION OF THE DRAWINGS

FIG. 1 is a plan view of the present brake assembly illustrating the brake in its unactuated condition.

FIG. 2 is a partial cross-sectional side view taken approximately along the lines 2—2 of FIG. 1 with a fragmentary section of the brake shoes illustrated.

FIG. 3 is a partial cross-sectional view similar to FIG. 2 but illustrating the cam shaft spacer and the anchor pin spacer being located in different positions to provide a different offset from that shown in FIG. 2.

FIG. 4 is a slightly enlarged plan view of the cam shaft of the present invention.

DESCRIPTION OF THE PREFERRED EMBODIMENT

Referring to the drawings and more particularly to FIGS. 1 and 2 a brake assembly 10 for use with a vehicle (not illustrated) is provided. The brake assembly 10 is a heavy-duty brake assembly which is preferably utilized with a vehicle, such as a truck. The brake assembly 10 includes a stamped spider member 12 which includes a plurality of openings 14 disposed therein. The stamped spider member 12 is adapted to be supported on an axle mounting face (not illustrated) of a truck. To this end, a plurality of bolts, not illustrated, can be inserted through the openings 14 disposed in the stamped spider member 12 to secure the brake mechanism 10 to the axle mounting face in a well-known manner. A dust shield 15 may be connected to the spider member 12 to shield the brake mechanism 10 from road generated dust in a well-known manner.

An air chamber mounting bracket assembly 16 is rigidly secured to one end of the spider member 12. The air chamber mounting bracket assembly 16 includes an air chamber mounting bracket arm 20 and a tube portion 18. An air chamber, not illustrated, may be mounted in a well-known manner on the arm 20. A cam shaft 22 having an S-cam member 24 disposed at one end thereof is supported for rotation about the longitudinal axis of the cam shaft 22 in the tube portion 18 of the air chamber mounting bracket assembly 16. A splined portion 26 is disposed on the cam shaft 22 on the opposite end of the cam shaft 22 on which the S-cam member 24 is disposed. A slack adjuster, schematically illustrated by the phantom lines 28, is adaptable to be splined to the splined section 26 of the cam shaft 22. The slack adjuster 28 is connected to an air chamber (not illustrated) in a well-known manner. Actuation of the air chamber effects rotation of the slack adjuster 28 which effects rotation of the cam shaft 22 and S-cam 24 is a well-known manner.

An anchor pin 30 is received within an opening 32 disposed in the spider member 12 in a location diametrically opposite to the location at which the S-cam 24 is supported by the spider 12. The anchor pin 30 includes an end portion 34 which is rigidly secured in the opening 32 in the spider member 12 in a cantilevered fashion. The anchor pin 30 includes an opposite end portion 36 having a ridge 38 formed thereon. The ridge 38 cooperates with brake shoes engaging therewith to prevent sliding movement of the brake shoes parallel to the longitudinal axis of the anchor pin 30.

A reinforcing plate 40 is secured to a flanged portion 42 on the spider member 12. The reinforcing plate 40 includes an opening 44 disposed therein which receives the one end 34 of the anchor pin 30 therein. Suitable means, such as welding, is utilized to rigidly secure the one end 34 of the anchor pin 30 to the reinforcing plate 40. Thus, the anchor pin 30 is supported in a cantilevered fashion by the cooperation of the reinforcing plate 40 and the opening 32 in the spider member 12. A cylindrical cavity 46 is provided in the interior of the anchor pin 30. The cylindrical cavity 46 extends parallel to the longitudinal axis of the anchor pin 30 and reduces the weight of the anchor pin. While the cavity 46 is shown terminating prior to the end 36 of the anchor pin 30, it should be apparent that the cavity 46 could extend from one end of the anchor pin to the other and provide a path for wires which may be used in a brake sensing system.

A pair of brake shoes 50, 52 are supported by the spider member 12. Each of the brake shoes 50, 52 includes a pair of webs 56, a shoetable 58 having one side connected to the webs 56, and friction pad members 60 connected to the opposite side of the shoetable 58 in a well-known manner. The upper or S-cam end of each of the web members 56, as is illustrated in FIG. 1, includes an opening 62 in which is journalled a roller pin 64. The roller pins 64 cooperate with the S-cam member 24 to effect pivotal movement of the brake shoes 50, 52 as will be described more fully hereinbelow. The lower or anchor pin end of each of the webs 56, as is illustrated in FIG. 1, includes an arcuate anchor pin slot 66 which is adapted to pivotally engage the cylindrical exterior surface of the anchor pin 30.

A return spring means 68 interconnects the upper ends of the brake shoes 50, 52 as is illustrated in FIG. 1, to bias the brake shoes 50, 52 toward their unactuated position. The return spring means 68 includes a coil spring 70 which has one end connected to a pin 72 disposed on the web 56 of the brake shoe 50 and a coil spring 74 which has one end connected to a pin 76 disposed on the web 56 of the brake shoe 52. The coil springs 70 and 74 are interconnected by a link member 78 and bias the brake shoes 50, 52 in a radially inwardly direction toward their unactuated position.

A shoe retaining spring means 80 is provided for interconnecting the lower ends of the brake shoes 50, 52 and biasing the brake shoes to effect continual engagement of the anchor pin slots 66 with the anchor pin 30. The shoe retaining spring means 80 includes a coil spring 82 having one end connected to a pin 84 disposed on the web member 56 of the brake shoe 50 and a coil spring 86 having one end connected to a pin 88 disposed on the web 56 of the brake shoe 52. An interconnecting link 90 is provided for interconnecting the coil springs 82 and 86. The interconnecting link 90 extends around the external surface 31 of the anchor pin 30 on the side of the anchor pin 30 which is remote from the S-cam 24. The construction of the shoe retaining spring means 80 allows the coil springs 82 and 86 to be spaced behind the shoetable 58 in a radially inwardly direction from the friction pads 60 disposed on the brake shoes. When a vehicle associated with the brake mechanism is braked, the friction pads 60 engage with a brake drum, not illustrated, in a well-known manner to retard rotation of the brake drum and effect braking of the vehicle. The frictional engagement between the brake drum and the friction pads 60 causes the generation of large amounts of heat as the kinetic energy of the vehicle is essentially converted to heat when the vehicle is stopped upon actuation of the brake mechanism 10. Locating the shoe retaining spring means 80 in a radially inward position from the friction pads 60, enables the spring means 80 to be shielded from the heat generated upon braking to thereby increase the life of the springs. The shoetables 58 of the brake shoes 50, 52 will act to shield the springs 82, 86 from the heat generated by the engagement of the friction pads 60 with the brake drum.

The three point mounting of the shoe retaining spring means 80, wherein the spring means 80 is connected to the pins 84 and 88 and extends around the anchor pin 30, provides for fast and easy shoe removal while at the same time shielding the spring means 80 from the heat generated in the braking mechanism. The interconnecting link 90 which extends around the anchor pin 30 has a tendency to direct the biasing force of the springs 82 and 86 through the anchor pin 30 to insure that the brake shoes 50, 52 are biased into engagement with the anchor pin 30. When it is desired to change shoes in the brake mechanism, the return spring 68 can be unhooked and the retaining spring 80 will allow the shoes 50 and 52 to spread apart like a clam shell about the anchor pin 30 to provide for easy removal of the shoes from the brake mechanism 10. In the prior art the retaining springs in some instances were located directly between the pins, such as pins 84 and 88. This provided a force which tended to make it difficult to remove the brake shoes from the anchor pin 30 when the return spring was disengaged. This is due to the moment arm established between the pins 84 and 88 on which the springs were acting and the anchor pin. However, in the present invention the moment arm is directed through the anchor pin and easy removal of the brake shoes is provided while still providing the necessary biasing force to insure engagement between the brake shoes 50, 52 and the anchor pin 30.

When it is desired to actuate brake mechanism 10, the S-cam 24 will be rotated in a counterclockwise direction as viewed in FIG. 1 by actuation of the air chamber, not illustrated, which will effect rotation of the cam shaft 22 through the slack adjuster 28 which engages the splines 26 in a well-known manner. Counterclockwise rotation of the S-cam 24 will cause the S-cam 24 to engage with the roller pins 64 and effect a pivotal movement in an outward radial direction of the brake shoes 50, 52 about the anchor pin 30. This will cause the brake pads 60 to engage with a brake drum, not illustrated, in a well-known manner to effect braking of a vehicle associated therewith. When the pressure in the air chamber is released, the return spacing means 68 will bias the brake shoes 50, 52 in a radially inwardly direction to rotate the S-cam 24 in a clockwise direction and effect disengagement of the brake pad 60 from the brake drum.

The cam shaft 22, more fully illustrated in FIG. 4, includes the S-cam 24 disposed at one end and the splined portion 26 at the opposite end. A cylindrical portion 96 interconnects the S-cam 24 and the splined portion 26. The cam shaft 22 includes a cylindrical chamber 106 disposed therein. The cylindrical chamber 106 is disposed substantially along the length of the longitudinal axis of the cam shaft 22 and reduces the weight of the cam shaft 22.

The S-cam 24 includes a rear surface 98 which is adapted to be engaged by a cam shaft spacer 100, as is illustrated in FIG. 2. The opposite end of the cam shaft 22 includes a snap ring groove 102 more fully illustrated in FIG. 4 which is adapted to receive a snap ring 104 disposed therein. The cam shaft 22 is adapted to be moved parallel to its longitudinal axis to change the offset between the S-cam 24 and the spider member 12. The offset is defined as the distance measured from the axle mounting face, not illustrated, to the brake centerline. Since the axle mounting face abutts the spider 12 varying the distance between the planar surface of the spider 12 adjacent the axle mounting face and the centerline of the S-cam will, in effect, vary the offset of the brake.

As is more fully illustrated in FIGS. 2 and 3, the cam shaft spacer 100 is selectively locatable on the cam shaft 22 either in its position shown in FIG. 2 adjacent the rear surface 98 of the S-cam 24 or in its position illustrated in FIG. 3 adjacent the splined portion 26 of the cam shaft 22. When the cam spacer 100 is in its position illustrated in FIG. 2, the spacer 100 will engage with the rear surface 98 of the S-cam 24 to move the centerline of the S-cam toward the left as viewed in the figures away from the spider 12. In this configuration, the snap ring 104 will be seated in the snap ring groove 102 to position the slack adjuster on the splines 26. The snap ring 104 will prevent relative horizontal movement parallel to the longitudinal axis of the cam shaft 22 between the air chamber mounting bracket 16 and the cam shaft 22.

If it is desired to vary the offset of the brake from that disclosed in FIG. 2, the cam spacer 100 may be removed from its position shown in FIG. 2 and disposed between the snap ring 104 and the slack adjuster 28 as is illustrated in FIG. 3. In this configuration the cam shaft 22 will move to the right from its position shown in FIG. 2 and the centerline of the S-cam 24 will be brought closer to the face of the spider 12. This will reduce the offset. In this configuration the snap ring 104 will engage with the cam spacer 100 to locate the cam shaft 22 relative to the air chamber mounting bracket 16. Thus, it should be apparent that the cam shaft spacer 100 is selectively locatable on the cam shaft 22 to vary the offset between the S-cam 24 and the spider 12.

An anchor pin spacer 108 is selectively locatable on the anchor pin 30 to position the brake shoes 50 and 52 to insure that the centerline of the brake shoes is aligned with the centerline of the S-cam 24. When the anchor pin spacer 108 is disposed in its position illustrated in FIG. 2, the spacer 108 will be disposed between the web 56 of the brake shoes and the spider 12. This will position the brake shoes 50, 52 to align with the centerline of the S-cam 24 when the cam spacer element 100 engages with the rear surface 98 of the S-cam 24, as is illustrated in FIG. 2. When the anchor pin spacer 108 is located in its position illustrated in FIG. 3, the spacer element 108 will be disposed between the ridge 38 disposed on the end of the anchor pin 30 and the web 56 of the brake shoes 50, 52. When the spacer element 108 is in its position illustrated in FIG. 3, it will enable the centerline of the brake shoes to be aligned with the centerline of the S-cam 24 when the cam spacer 100 is positioned in its position illustrated in FIG. 3. Thus, the anchor spacer element 108 is selectively locatable on the anchor pin 30 to selectively adjust the relative position of the centerline of the brake shoes and the spider member 12. The spacer elements 100 and 108 cooperate to enable the brake mechanism 10 of the present invention to be utilized with various offsets.

The construction of the brake mechanism 10 of the present invention is designed to reduce the weight of the brake mechanism. By utilizing a stamped spider member rather than a cast spider member as has been previously utilized in the prior art, a weight reduction is realized. Additionally, by providing the cavities 106 in the cam shaft 22 and the cavity 46 in the anchor pin 30 additional weight reductions are achieved.

From the foregoing it should be apparent that a new and improved brake assembly for vehicle has been provided which includes a stamped spider member, an air chamber mounting bracket assembly attached to the spider member, a cam shaft supported in the air chamber mounting bracket assembly and having an S-cam member affixed to one end thereof. Cam spacer means are selectively locatable on the cam shaft for adjusting the relative position of the S-cam and the spider member. An anchor pin is supported in a centilevered fashion on the spider member in a position diametrically opposite from the one end of the spider member on which the air chamber mounting bracket assembly is secured. A pair of brake shoes are mounted in the brake mechanism. The brake shoes each have one or an anchor pin end which is engaging and pivotable about the anchor pin and an opposite or S-cam end which is engaging the S-cam member. Anchor pin spacer means are selectively locatable on the anchor pin to adjust the relative position of the brake shoes and the spider member. Return spring means interconnect the opposite or S-cam ends of the brake shoes for biasing the brake shoes toward a nonactuated position and shoe retaining spring means interconnect the one or anchor pin ends of the brake shoes for biasing the anchor pin end of the brake shoes against the anchor pin. The shoe retaining spring means extend around the anchor pin with the spring means being spaced inwardly in a radial direction from the shoetables of the brake shoes to thereby shield the shoe retaining spring means from the heat generated when the vehicle is braked.

We claim:

1. A brake assembly for a vehicle comprising a stamped spider member, an air chamber mounting bracket assembly rigidly fixed to one end of said stamped spider member, a cam shaft supported in said air chamber mounting bracket assembly and having an S-cam member affixed to one end thereof, said S-cam member being secured to said cam shaft for rotational movement about the longitudinal axis of said cam shaft, cam spacer means selectively locatable at spaced apart locations on said cam shaft for adjusting the longitudinal position of said cam shaft and said S-cam relative to said air chamber mounting bracket assembly to adjust the relative position of said S-cam and said spider member, an anchor pin means supported on said spider member in a position diametrically opposite from said one end of said spider member on which said air chamber mounting bracket assembly is secured, said anchor pin means being supported in a cantilevered fashion at one end thereof by said spider member, a pair of brake shoes, each of which has one end engaging and pivotable about said anchor pin means and an opposite end engaging said S-cam member, rotation of said S-cam member effecting pivotal movement of said brake shoes about said anchor pin means to brake a vehicle associated therewith, anchor pin spacer means selectively locatable at spaced apart locations on said anchor pin means and engaging said one end of said brake shoes to selectively adjust the relative position of said brake shoes and said spider member, return spring means interconnecting said opposite ends of said brake shoes for biasing said brake shoes toward a nonactuating position and shoe retaining spring means interconnecting said one ends of said brake shoes for biasing said one ends of said brake shoes against said anchor pin means.

2. A brake assembly for a vehicle as defined in claim 1 wherein said spider member includes an opening therein having a cross-sectional configuration substantially indentical to the cross-sectional configuration of said anchor pin means, said anchor pin means comprising a single anchor pin rigidly received and supported adjacent one end thereof in said opening, and further including a reinforcing plate secured to said spider member and having an opening therein for receiving said one end of said anchor pin therein, said one end of said anchor pin being rigidly secured to said reinforcement plate.

3. A brake assembly for a vehicle as defined in claim 1 further including a brake drum having an annular braking surface and wherein each of said brake shoes includes a web, a shoetable supported by said web and friction pad means supported on said shoetable, said shoe retaining spring means being connected to a web of each of said brake shoes adjacent said one end thereof, said shoe retaining spring means being spaced inwardly in a radial direction from said shoetables of said brake shoes, said shoetables of said brake shoe being interposed between said annular braking surface of said brake drum and said shoe retaining spring means to thereby enable said shoetables to shield said shoe retaining spring means from the heat generated by said friction pad means when the vehicle is braked.

4. A brake assembly for a vehicle as defined in claim 3 wherein said shoe retaining spring means extends around said anchor pin means and establishes a biasing force which is directed between said one ends of said brake shoes through said anchor pin means.

5. A brake assembly for a vehicle as defined in claim 4 wherein said shoe retaining spring means includes first spring means having one end connected to said web of one of said brake shoes and an opposite end, second spring means having one end connected to said web of the other of said brake shoes and an opposite end, and an interconnecting link interconnecting said opposite ends of said first and second spring means.

6. A brake assembly for a vehicle as defined in claim 5 wherein said interconnecting link engages and extends around said anchor pin means.

7. A brake assembly for a vehicle as defined in claim 1 wherein said cam spacer means includes a cam spacer member selectively locatable at a first position on said cam shaft for adjusting the axial position of said cam shaft relative to said spider member to position the centerline of said S-cam attached to said cam shaft at a first predetermined distance from said spider member and selectively locatable at a second position spaced apart from said first position on said cam shaft for adjusting the axial position of said cam shaft relative to said spider member to position the centerline of said S-cam a second predetermined distance from said spider member.

8. A brake assembly for a vehicle as defined in claim 7 wherein said anchor pin spacer means includes an anchor pin spacer member selectively locatable at a first position on said anchor pin means for positioning the centerline of said brake shoes said first predetermined distance from said spider member and selectively locatable at a second position spaced apart from said first position on said anchor pin means for positioning the centerline of said brake shoes said second predetermined distance from said spider member.

9. A brake assembly for a vehicle as defined in claim 1 wherein said anchor pin spacer means includes an anchor pin spacer member selectively locatable at a first position on said anchor pin means for positioning the centerline of said brake shoes said first predetermined distance from said spider member and selectively locatable at a second position spaced apart from said first position on said anchor pin means for positioning the centerline of said brake shoes said second predetermined distance from said spider member.

* * * * *